H. DECH.
METHOD OF MAKING AN INNER TUBE FOR TIRES.
APPLICATION FILED DEC. 30, 1914.
1,209,268. Patented Dec. 19, 1916.
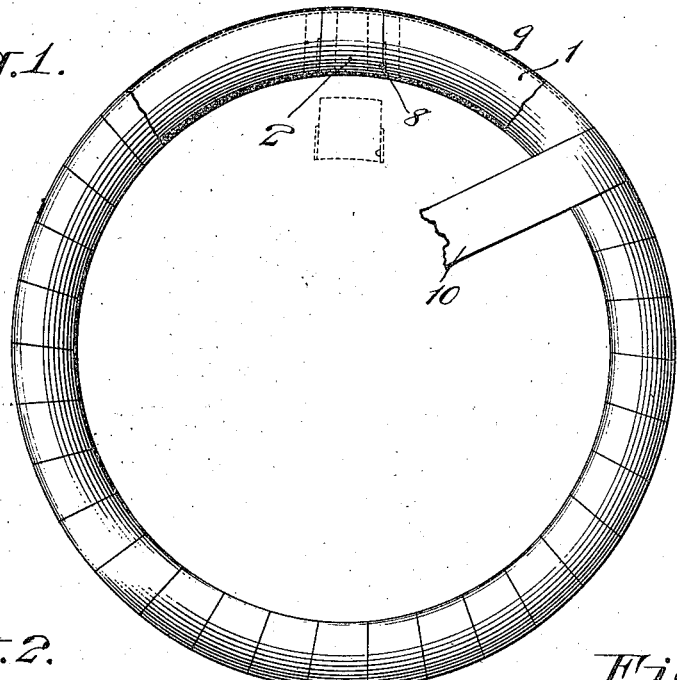
Fig. 1.
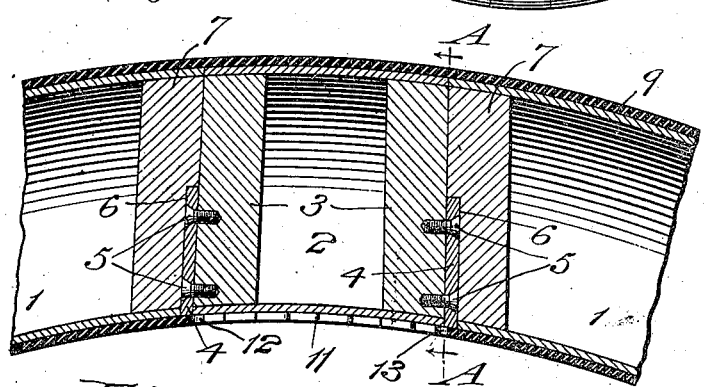
Fig. 2.
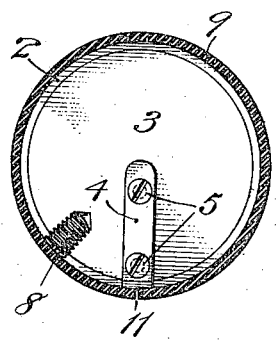
Fig. 3.
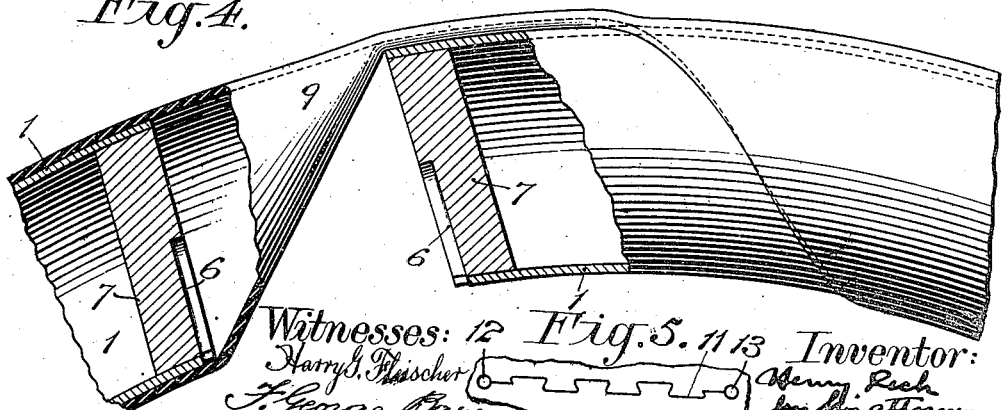
Fig. 4.
Fig. 5.
Witnesses:
Harry J. Fleischer
F. George Barry
Inventor:
Henry Dech
by his attorney
Brown & Seward

UNITED STATES PATENT OFFICE.

HENRY DECH, OF TRENTON, NEW JERSEY, ASSIGNOR TO MERCER TIRE COMPANY, OF TRENTON, NEW JERSEY, A CORPORATION OF NEW JERSEY.

METHOD OF MAKING AN INNER TUBE FOR TIRES.

1,209,268.   Specification of Letters Patent.   Patented Dec. 19, 1916.

Application filed December 30, 1914.   Serial No. 879,701.

*To all whom it may concern:*

Be it known that I, HENRY DECH, a citizen of the United States, and resident of Trenton, in the county of Mercer and State of New Jersey, have invented a new and useful Improvement in Methods of Making an Inner Tube for Tires, of which the following is a specification.

This invention relates to inner tubes for pneumatic vehicle tires and to the method of making the same, with the object in view of providing an article of this character which may be expeditiously and cheaply manufactured in circular form and without any splice or other joint therein. It has been customary heretofore to manufacture these inner tubes by building them up on a straight pole and wrapping them spirally with cloth; after which, the tube was vulcanized in this position. At the end of vulcanization, the wrapper was removed, the tube stripped from the pole, its ends telescoped and secured in that form, by cementing or in some other convenient way. The making of the splice involves a considerable amount of labor and increases the opportunities for the production of defective tubes. Furthermore, when the tube is made in straight form, and, after vulcanization, bent into annular form, there is an unequal strain in the rubber in the various parts of the tube. This is also a disadvantage. By my invention the tube is manufactured in its final form on an annular mandrel which is subsequently removed through the slit provided for the insertion of the valve.

A practical embodiment of one form of apparatus which may be used in carrying out my invention is shown in the accompanying drawings, in which, Figure 1 represents a side view, partly broken away, showing the tube built up on a mandrel and wrapped; a portion of the mandrel being shown in withdrawn position in dotted lines. Fig. 2 represents an enlarged detail section showing a portion of the mandrel with the tube thereon. Fig. 3 represents a section taken in the plane of the line A—A of Fig. 2, looking in the direction of the arrows. Fig. 4 represents an enlarged detail side view, partly broken away, illustrating the manner of removing the completed tube from the mandrel, and Fig. 5 represents a detail plan view of a portion of the tube, showing the slit therein.

The mandrel is annular in form and circular in cross section, and comprises two parts denoted respectively by 1 and 2. The part 1 is almost completely circular, but has the smaller section 2 severed therefrom. The section 2 is slightly tapered outwardly in order to facilitate its withdrawal inwardly. This section is shown as hollow but provided with solid ends 3, which have splines 4 secured to their faces by means of screws 5. These splines 4 are fitted to slide in keyways 6 formed in the solid ends 7 of the portion 1. It will be noted that the keyways only extend part way across the faces of the ends 7, so that the ends of the splines 4 may abut against the outer walls of the said keyways and thus prevent further outward movement of the section 2.

When the section 2 is in the position just described and shown in Figs. 1 and 2, it may be firmly locked in place by means of the set screw 8, which is adapted to fit in a hole drilled and tapped at one junction of the parts 1 and 2, as clearly shown in Fig. 1.

In manufacturing the tube, the section 2 is secured in the section 1 as just described, in order to form a circular mandrel. On this mandrel the tube 9 is built up in the usual manner and of the usual material. After the tube has been built, the whole is wrapped spirally and in an annular course by a wrapping of muslin or other appropriate fabric 10, in a manner well understood in the art. This assembly is then submitted to a suitable heat for a suitable length of time, in order to properly vulcanize the tube; the details of which are well known and within the knowledge and skill of the art. After vulcanization, the wrapper 10 is removed. When the wrapper 10 has been removed, the inner periphery of the tube is slit, as indicated at 11, at a point opposite the section 2, and for a distance slightly greater than the length of the said section. This slit is preferably made by punching two holes 12, 13, in the tube, the desired distance apart, and then cutting the tube from one hole to the other. These holes provide rounded ends for the slit, which permits it to be freely stretched without danger of tearing. The cut is zigzag in form, as shown in Fig. 5, in order that the edges of the slit may dovetail into each other when reunited. The set screw 8 is then removed and the section 2 withdrawn inwardly through the slit 11, as indicated in dotted lines in Fig. 1. The operator then takes hold of the tire and draws it peripherally around the part 1, as indicated in Fig. 4. In starting this operation, the tube is distorted so as to cause one end of the part 1 to stick through the slit 11. A continuance of this peripheral movement of the tube on the part 1 will, as will readily be seen, result in the entire part 1 passing out through the slit 11; or, in other words, result in the tube being drawn off from the said part 1. The next step consists in providing the valve for the tube, which may be secured, in the customary manner, in the slit 11, with the usual cemented patches and inner and outer plates; all of which is well understood and usually resorted to in the ordinary ways of manufacturing these inner tubes. In securing the valve in place, the dovetailed edges of the slit 11 are carefully fitted together; thereby assisting in the firm sealing of the slit.

It will be seen from the above that the tube is manufactured in the form desired for its use, and that, consequently, all portions of the tube are under substantially equivalent tension when in use. It will further be seen that there is no splice and that the only opening in the tube at the end of its vulcanization is the one which is necessarily provided for the insertion of the customary valve.

It will be understood that various changes may be resorted to in the form of apparatus and manner of carrying out my method which will be within the spirit and scope of my invention, and hence I do not intend to be limited to the specific details herein shown and described, except as they may be included in the claims.

What I claim is:

1. The method of making an endless inner tube for pneumatic tires, comprising, first, forming the tube on a circular, sectional mandrel; second, wrapping the tube and mandrel with fabric; third, vulcanizing the tube; fourth, slitting the tube for the insertion of the valve; fifth, withdrawing a section of the mandrel through the said slit; sixth, drawing the tube peripherally off the remainder of the mandrel; and seventh, fitting a valve in said slit.

2. The method of making an endless inner tube for pneumatic tires, comprising first, forming the tube on a circular, sectional mandrel; second, wrapping the tube and mandrel with fabric; third, vulcanizing the tube; fourth, making a round-ended zigzag slit in the tube for the insertion of the valve; fifth, withdrawing a section of the mandrel through the said slit; sixth, drawing the tube peripherally over the remainder of the mandrel; and, seventh, fitting a valve in the said slit.

In testimony, that I claim the foregoing as my invention, I have signed my name in presence of two witnesses, this sixteenth day of December 1914.

HENRY DECH.

Witnesses:
F. GEORGE BARRY,
HENRY C. THIEME.